(12) United States Patent
Cheng et al.

(10) Patent No.: US 8,406,326 B2
(45) Date of Patent: Mar. 26, 2013

(54) EXPLOITING CHANNEL TIME CORRELATION TO REDUCE CHANNEL STATE INFORMATION FEEDBACK BITRATE

(75) Inventors: Jung-Fu Cheng, Fremont, CA (US);
Dennis Hui, Cupertino, CA (US);
Kambiz Zangi, Chapel Hill, CA (US);
Leonid Krasny, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 356 days.

(21) Appl. No.: 12/779,106

(22) Filed: May 13, 2010

(65) Prior Publication Data

US 2011/0280287 A1 Nov. 17, 2011

(51) Int. Cl.
*H04K 1/10* (2006.01)
(52) U.S. Cl. ........ 375/260; 375/267; 375/299; 375/347; 375/349
(58) Field of Classification Search .................. 375/260, 375/267, 299, 347, 349
See application file for complete search history.

(56) References Cited

U.S. PATENT DOCUMENTS

| | | | |
|---|---|---|---|
| 2007/0258366 A1* | 11/2007 | Imamura ........................ | 370/230 |
| 2009/0180558 A1* | 7/2009 | Ma et al. ........................ | 375/260 |
| 2010/0008431 A1 | 1/2010 | Wu et al. | |

OTHER PUBLICATIONS

"3rd Generation Partnership Project; Technical Specification Group Radio Access Network; Spatial channel model for Multiple Input Multiple Output (MIMO) simulation", 3GPP TR 25.996 V8.0.0 (Dec. 2008), whole document.
Lloyd S. P., "Least Squares Quantization in PCM", IEEE Transactions on Information Theory, vol. 28 Issue 2, Mar. 1982, whole document.

\* cited by examiner

*Primary Examiner* — Kabir A Timory

(57) ABSTRACT

The required bitrate for reporting channel state information from a network transceiver to the network is dramatically reduced, while maintaining fidelity of channel estimates, by exploiting prior channel estimates and the time correlation of channel response. For a selected set of sub-carriers, the transceiver estimates channel frequency response from pilot signals. The transceiver also predicts the frequency response for each selected sub-carrier, by multiplying a state vector comprising prior frequency response estimate and a coefficient vector comprising linear predictive coefficients. The predicted frequency response is subtracted from the estimated frequency response, and the prediction error is quantized and transmitted to the network. The network maintains a corresponding state vector and predictive coefficient vector, and also predicts a frequency response for each selected sub-carrier. The received prediction error is inverse quantized and subtracted from the predicted frequency response to yield a frequency response corresponding to that estimated at the transceiver.

12 Claims, 6 Drawing Sheets

EXPLOITING CHANNEL TIME CORRELATION TO REDUCE CHANNEL STATE INFORMATION FEEDBACK BITRATE

FIELD OF THE INVENTION

The present invention relates generally to wireless communication networks, and in particular to an efficient system and method for transmitting channel state information to the network by exploiting the time correlation of channel response.

BACKGROUND

Wireless communication networks transmit communication signals in the downlink over radio frequency channels from fixed transceivers, known as base stations, to mobile user equipment (UE) within a geographic area, or cell. The UE transmit signals in the uplink to one or more base stations. In both cases, the received signal may be characterized as the transmitted signal, altered by channel effects, plus noise and interference. To recover the transmitted signal from a received signal, a receiver thus requires both an estimate of the channel, and an estimate of the noise/interference. The characterization of a channel is known as channel state information (CSI). One known way to estimate a channel is to periodically transmit known reference symbols, also known as pilot symbols. Since the reference symbols are known by the receiver, any deviation in the received symbols from the reference symbols (once estimated noise/interference is removed) is caused by channel effects. An accurate estimate of CSI allows a receiver to more accurately recover transmitted signals from received signals. In addition, by transmitting CSI from the receiver to a transmitter, the transmitter may select the transmission characteristics—such as coding, modulation, and the like—best suited for the current channel state. This is known as channel-dependent link adaptation.

Modern wireless communication networks are interference limited. The networks typically process transmissions directed to each UE in a cell independently. Transmissions to other UEs in the same cell are regarded as interference at a given UE—giving rise to the term mutual interference. One approach to mitigating mutual interference is multi-user multiple input/multiple output (MU-MIMO). With MU-MIMO, a signal to be transmitted to multiple users is formed jointly, and these transmissions are formed taking into account the interference that transmission to one user creates at all other users. To operate most effectively, a MU-MIMO transmitter requires information about the transmission channels to each UE. That is, the transmitter requires CSI. Note that both single-cell MU-MIMO techniques and multi-cell MU-MIMO techniques can benefit from the availability of CSI at the transmitter.

Even without MU-MIMO transmission, CSI at the network can solve one of the most fundamental problems plaguing current wireless system—the inaccuracy in channel-dependent link adaptation due to the network not being able to predict the interference experienced by the UEs (a problem closely related to the well-known flash-light effect). Once the network knows the CSI of bases near each UE, the network can accurately predict the SINR at each UE, resulting in significantly more accurate link adaptation.

Even though the advantages of direct CSI feedback are clear, the major issue with direct CSI feedback is overhead. Full CSI feedback requires a high bitrate to transmit the CSI from each UE to the network. Time-frequency uplink channel resources must be used to carry the CSI feedback on the uplink channel, making these resources unavailable for transmitting user data on the uplink—the CSI feedback transmissions are thus pure overhead, directly reducing the efficiency of uplink data transmissions. Conveying direct CSI feedback to the network without consuming excessive uplink resources stands as a major challenge of modern communication system design.

Digital loopback was recently proposed as an efficient means to deliver CSI to the network with reasonable overhead and with quite low complexity. See, e.g., co-pending U.S. patent application Ser. No. 12/555,966, filed Sep. 9, 2009, tilted "Efficient Uplink Transmission of Channel State Information," assigned to the assignee of the present application and incorporated herein by reference in its entirety. In digital loopback, a UE transmits succinct, direct channel state information to the network without substantially increasing uplink overhead. The UE receives and processes reference symbols over a set of non-uniformly spaced sub-carriers, selected according to a scheme synchronized to the network. The frequency response for each selected sub-carrier is estimated conventionally, and the results are periodically quantized and transmitted to the network on an uplink control channel. This is referred to herein as persistent digital loopback. Based on the information transmitted by the UE on the uplink channel, the network is able to construct an estimate of the frequency response of the channel at all sub-carriers, with a certain fidelity for a given bitrate of CSI. Naturally, the higher the bitrate of the CSI, the higher the fidelity of the channel estimation at the network will be.

SUMMARY

According to one or more embodiments disclosed and claimed herein, CSI reporting bitrate is dramatically reduced, while maintaining fidelity of channel estimates communicated to the network, by exploiting prior channel estimates and the time correlation of channel response. A network transceiver estimates channel frequency response from pilot signals for a selected set of sub-carriers, as in prior art implementations of digital loopback. The transceiver also predicts the frequency response for each selected sub-carrier, by multiplying a state vector comprising prior frequency response estimate and a coefficient vector comprising linear predictive coefficients. The predicted frequency response is subtracted from the estimated frequency response, and the prediction error is quantized and transmitted to the network. The network maintains a corresponding state vector and predictive coefficient vector, and also predicts a frequency response, for each selected sub-carrier. The received prediction error is inverse quantized and subtracted from the predicted frequency response to yield the frequency response estimated at the transceiver.

One embodiment relates to an efficient method of reporting CSI by a UE operative in a wireless communication network in which downlink data is modulated onto a plurality of sub-carriers, each having a different frequency. At each iteration, a plurality of known reference symbols is received over a subset of the plurality of sub-carriers. A set of sub-carriers is selected using a selection scheme synchronized to the network. For each selected sub-carrier, a frequency response is estimated; a frequency response is predicted, in a manner synchronized to the network, based on prior frequency response estimates and a time correlation of channel response; the predicted frequency response is subtracted from the estimated frequency response to yield a prediction error; and the prediction error is quantized. The quantized prediction errors for all selected sub-carriers are transmitted to the network via an uplink control channel.

Another embodiment relates to a method of interpreting CSI by a network node operative in a wireless communication network in which downlink data is modulated onto a plurality of sub-carriers, each having a different frequency. At each iteration, quantized prediction errors for selected sub-carriers are received from a network transceiver. For each selected sub-carrier, the quantized prediction errors are inverse quantized; a frequency response is predicted, in a manner synchronized to the network transceiver, based on prior frequency response estimates and a time correlation of channel response; and the prediction error is added to the predicted frequency response to yield a current quantized frequency response estimate. The quantized frequency response estimates for all selected sub-carriers are used to characterize the downlink channel to the network transceiver.

DETAILED DESCRIPTION

For the purpose of clear disclosure and full enablement, the present invention is described herein as embodied in a wireless communication network based on Orthogonal Frequency Division Multiplex (OFDM) modulation. More specifically, embodiments herein are based on the Evolved Universal Terrestrial Radio Access (E-UTRA) system, which is also commonly referred to as the Long-Term Evolution (LTE) of the widely deployed WCDMA systems. Those of skill in the art will readily appreciate that these systems are representative only and not limiting, and will be able to apply the principles and techniques of the present invention to a wide variety of wireless communication systems, based different access and modulation methods, given the teachings of the present disclosure.

Figure 1:
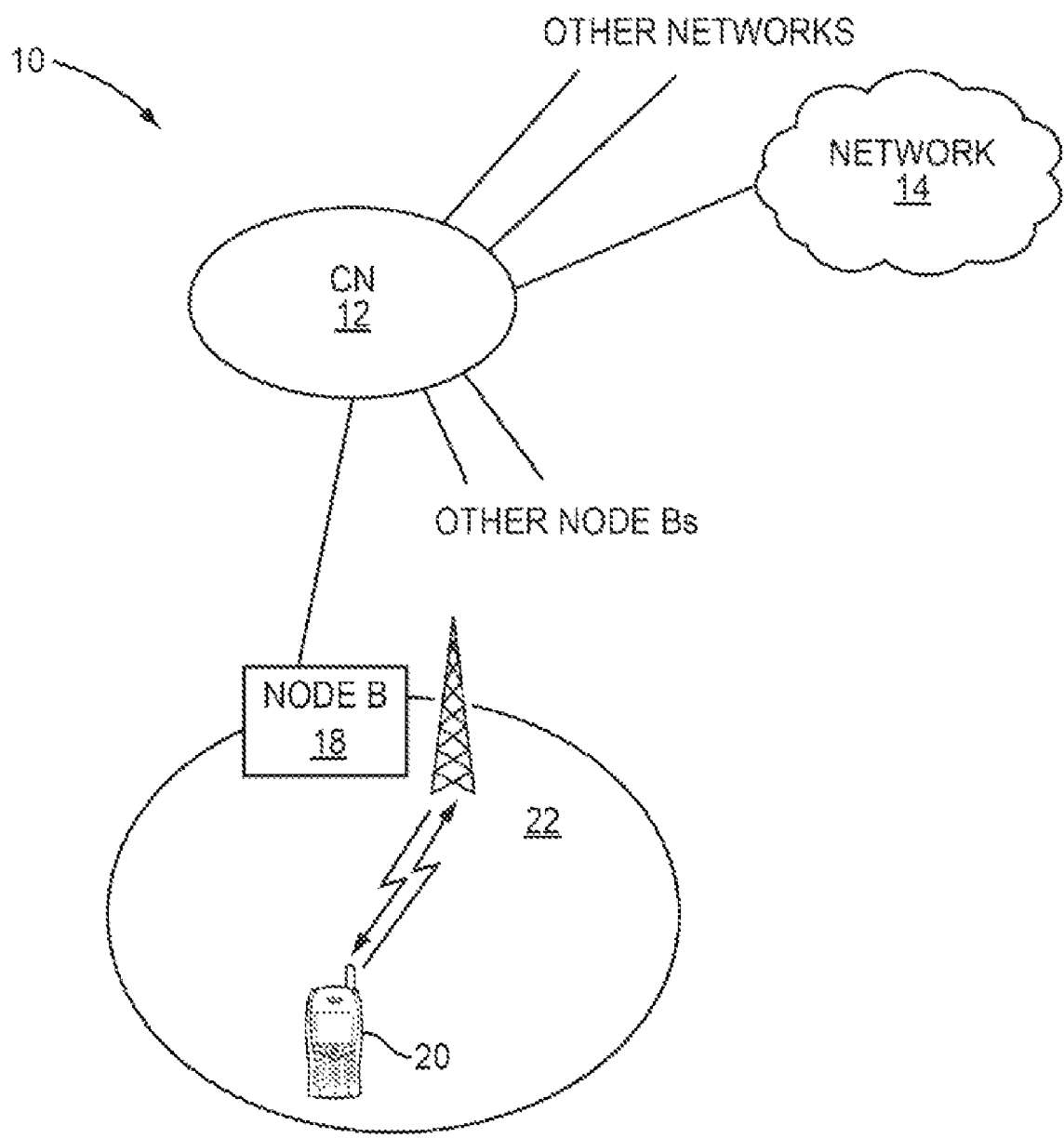
FIG. 1 is a functional block diagram of a wireless communication network.

FIG. 1 depicts a wireless communication network 10. The network 10 includes a Core Network (CN) 12, communicatively connected to one or more other networks 14, such as the Public Switched Telephone Network (PSTN), the Internet, or the like. Communicatively connected to the CN 12 are one or more Node B stations 18. The Node B 18, also known as a base station, includes radio frequency (RF) equipment and antennas necessary to effect wireless radio communications with one or more user equipment (UE) 20 within a geographic region, or cell 22. As depicted, the Node B 18 transmits data and control signals to the UE 20 on one or more downlink channels, and the UE similarly transmits data and control signals to the Node B 18 on the uplink.

As described above, in persistent digital loopback, frequency response estimates for selected sub-carriers are periodically quantized and transmitted to the network on an uplink control channel. This method of CSI feedback does not exploit the time correlation of the channel at the reporting intervals. Exploiting this time correlation, embodiments of the present invention provide a CSI feedback scheme that can achieve the same fidelity of persistent digital loopback, but with a lower uplink bitrate (i.e., lower overhead and hence higher spectral efficiency).

Assume that the UE 20 reports the frequency response of the channel at M sub-carriers every T [seconds], i.e., at times t=0, T, 2T, 3T, ...
and denote the frequency response at the m-th reported sub-carrier at the n-th reporting instance by $H(k_m;n)$. Furthermore, the time correlation of frequency response at a given subcarrier is denoted by:

$$\rho_H(k;l) = E\{H(k;n)H^*(k;n-l)\} \quad (1)$$

Because $\rho_H(k;l)$ is non-zero for l not equal to zero, the frequency response at one frequency and two different reporting times can be highly Correlated.

In the persistent digital loopback scheme, the CSI bits associated with H(k;n) that are reported at the n-th reporting instance are generated independently from past values of the channel (i.e., Independently of H(k;n−1), H(k;n−2), H(k;n−3), ... ). This results in redundancy in the information reported to the network.

Figure 2:
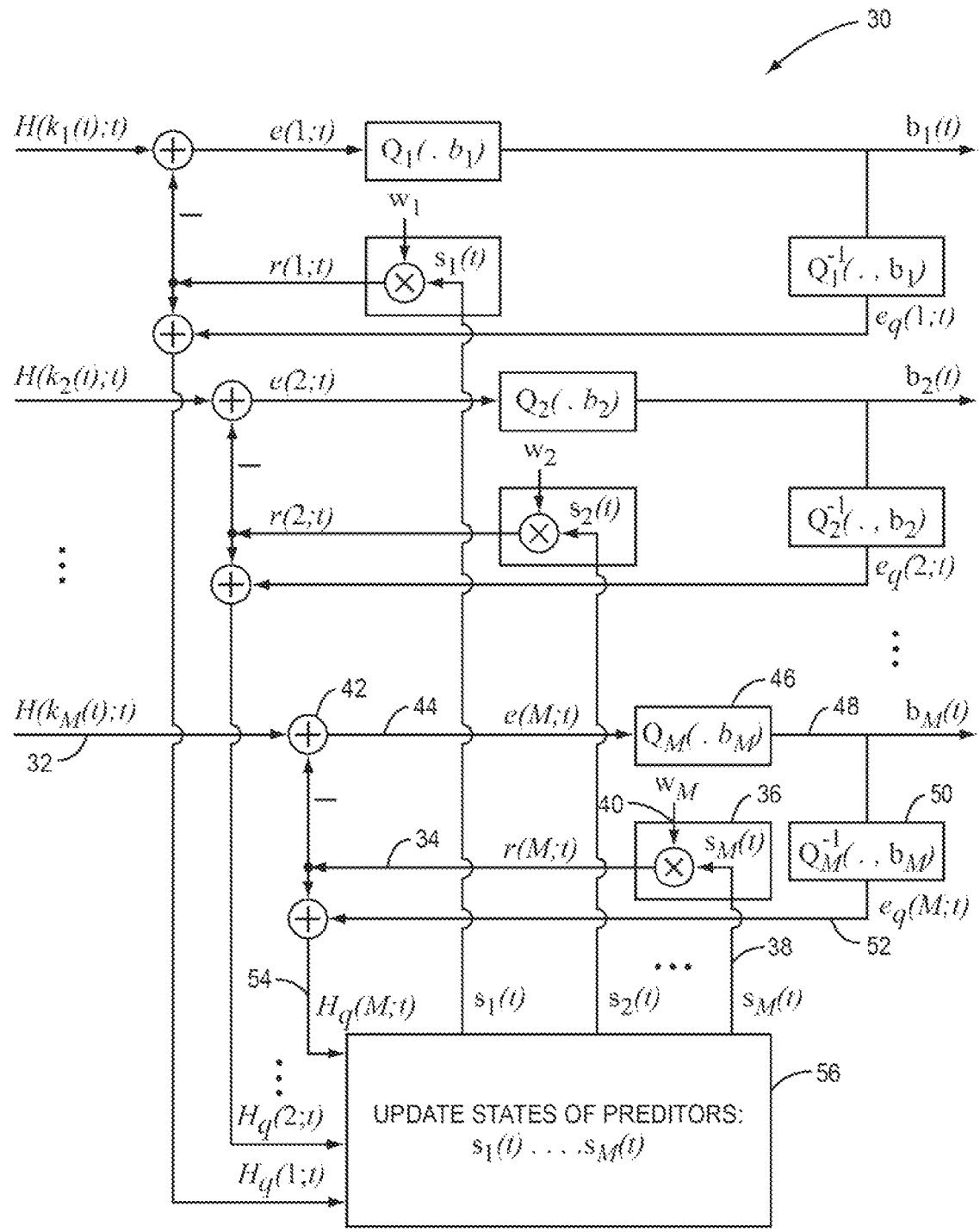
FIG. 2 is a functional block diagram of generating Channel State Information (CSI) at a network transceiver.
Figure 3:
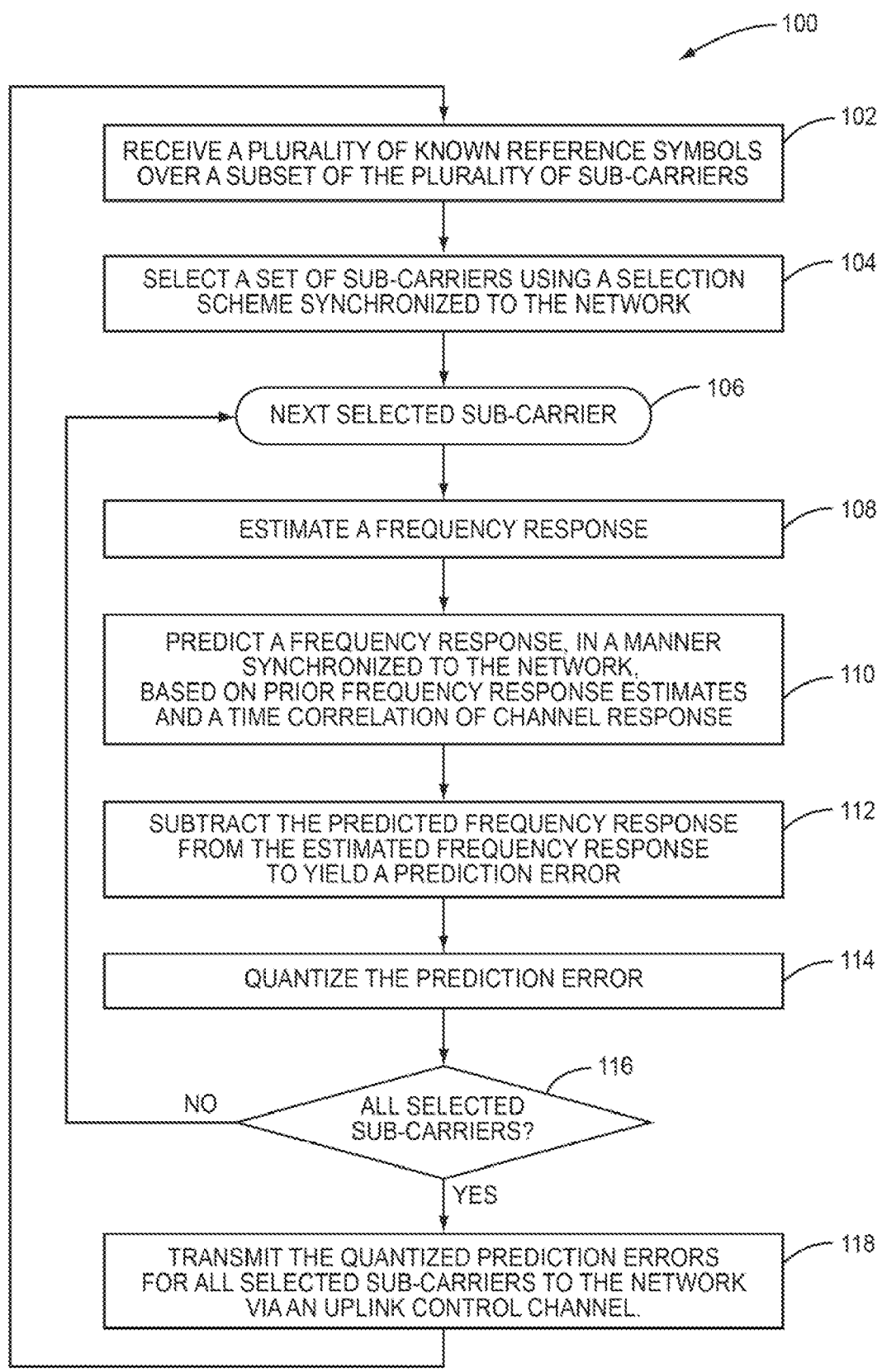
FIG. 3 is a flow diagram of a method of generating CSI at a network transceiver.
Figure 4:
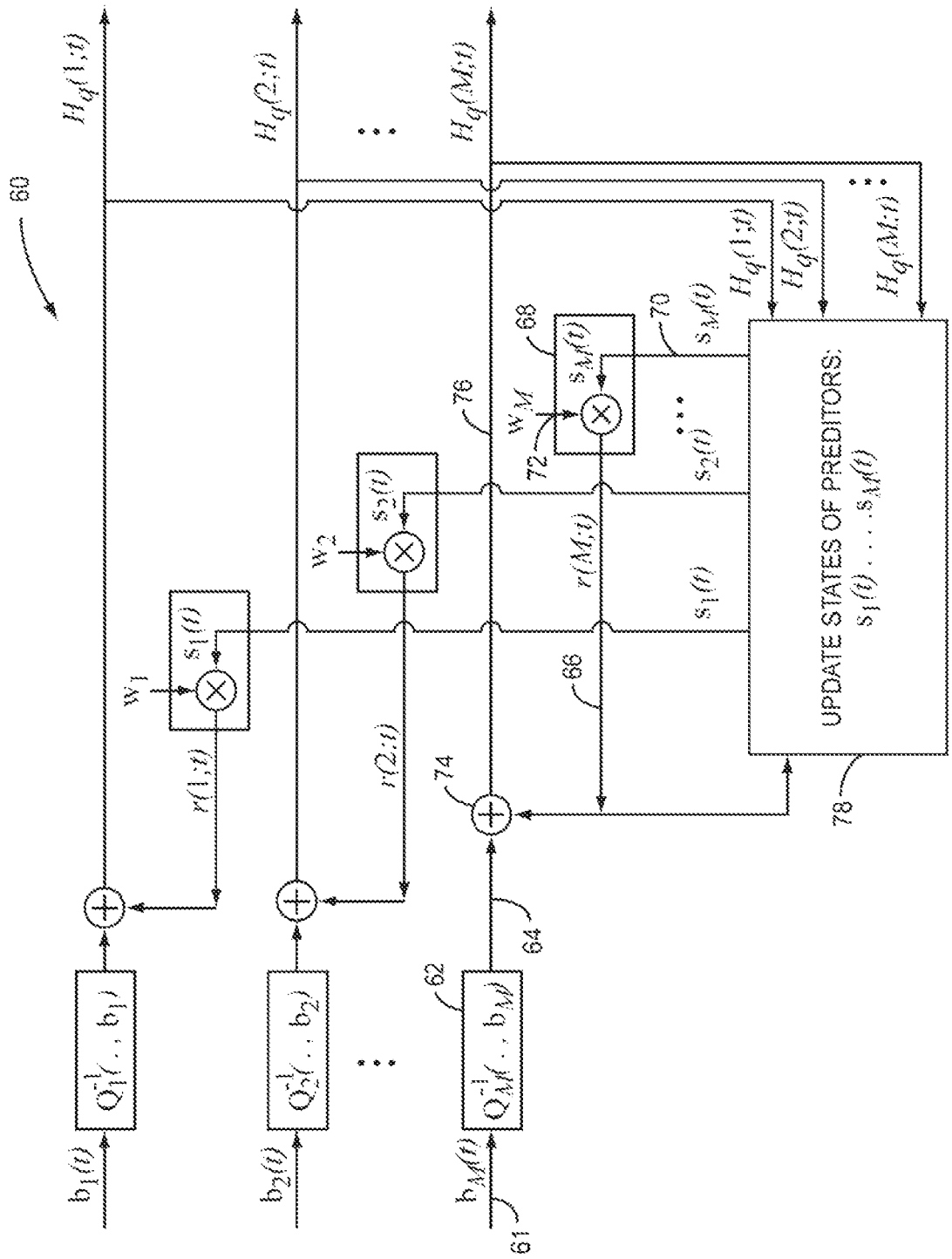
FIG. 4 is a functional block diagram of interpreting CSI at a network node.

FIG. 2 is a functional block diagram 30 of an efficient method 100, depicted in FIG. 3 in flow diagram form, of reporting CSI by a UE operative in a wireless network in which downlink data is modulated onto a plurality of sub-carriers, each having a different frequency. At each iteration, or reporting interval, the UE receives a plurality of known reference symbols over a subset of the plurality of sub-carriers (step 102). As known in the art, the reference symbols may be scattered in time and frequency according to a scattered pilot pattern. The UE selects a subset of the sub-carriers, using a selection scheme synchronized to the network (step 104). The sub-carriers may be selected in numerous ways, as described in co-pending application Ser. No. 12/555,966 cited above. The selected sub-carriers are denoted by $(k_1, k_2, \ldots, k_M)$. Channel conditions are then estimated and predicted for each selected sub-carrier (step 106), denoted in the following discussion as the m-th selected sub-carrier, denoted $k_m$.

The UE 20 estimates the frequency response $H(k_m;t)$ 32, using known techniques (step 108). The UE 20 then predicts a frequency response value r(m;t) 34 for $k_m$, based on prior frequency response estimates and a time correlation of channel response (step 110). The frequency response prediction is generated by a linear predictor 36. Each predictor 36 obtains a state vector $s_m(t)$ 38 of size L×1, and a prediction coefficient vector $w_m$ 40 of size 1×L. The state vector $s_m(t)$ 38 is a vector of prior values of quantized frequency response estimates (as described below) of $k_m$. The prediction coefficient vector $w_m$ 40 is a vector of linear predictive coefficients based on a time correlation of channel response for $k_m$. The state vector $s_m(t)$ 38 and prediction coefficient vector $w_m$ 40 are multiplied in the linear predictor 36 to yield the frequency response prediction r(m;t) 34 for $k_m$, which is a scalar complex-valued number.

The UE 20 next subtracts the predicted frequency response r(m;t) 34 from the estimated frequency response $H(k_m;t)$ 32 at summer 42, yielding a prediction error e(m;t) 44 (step 112). The real and imaginary parts of $e(k_m;t)$ 44 are separately quantized by a quantizer $Q_m(.,b_m)$ 46 (step 114). The quantizer $Q_m(.,b_m)$ 46 has $2^{b_m}$ quantization levels per real part and per imaginary part, and yields quantized bits $b_m(t)$ 48. This process is repeated for all selected sub-carriers $(k_1, k_2, \ldots, k_M)$ (steps 116, 106)

The quantized bits of all selected sub-carriers are then transmitted via a suitable control channel from UE 20 to the network 10 (step 118). As known in the art, the transmission process may include adding redundancy, such as cyclic redundancy coding (CRC), forward error correction (FEC) coding, and the like, to ensure reliable transmission to the network 10. The quantized bits, representing the prediction error for each selected sub-carrier, comprise significantly less data (and hence uplink overhead) than if the entire estimated frequency response $H(k_m;t)$ 32 were transmitted, as is the case in persistent digital loopback CSI reporting.

An important aspect of embodiments of the present invention is the updating of the state vector $s_m(t)$ 38 for each selected sub-carrier. During each reporting interval, the quantized bits $b_m(t)$ 48 reported to the network 10 are inversely quantized at inverse quantizer 50, yielding the quantized error $e_q(M;t)$ 52. This value is added to the predicted frequency response $r(m;t)$ 34, yielding a quantized frequency response estimate $H_q(M;t)$ 54. Note that the quantized frequency response estimate $H_q(M;t)$ 54 depends only on the predicted frequency response $r(m;t)$ 34 and the quantized bits $b_m(t)$ 48 transmitted to the network 10. The quantized frequency response estimate $H_q(M;t)$ 54 is added to the state vector $s_m(t)$ 38, and the oldest value in $s_m(t)$ 38 is dropped. This processing of the state vector $s_m(t)$ 38, and well as storage, is performed in the state vector update block 56. The state vectors for all selected sub-carriers are updated similarly. The method 100 repeats for each reporting interval.

Figure 5:
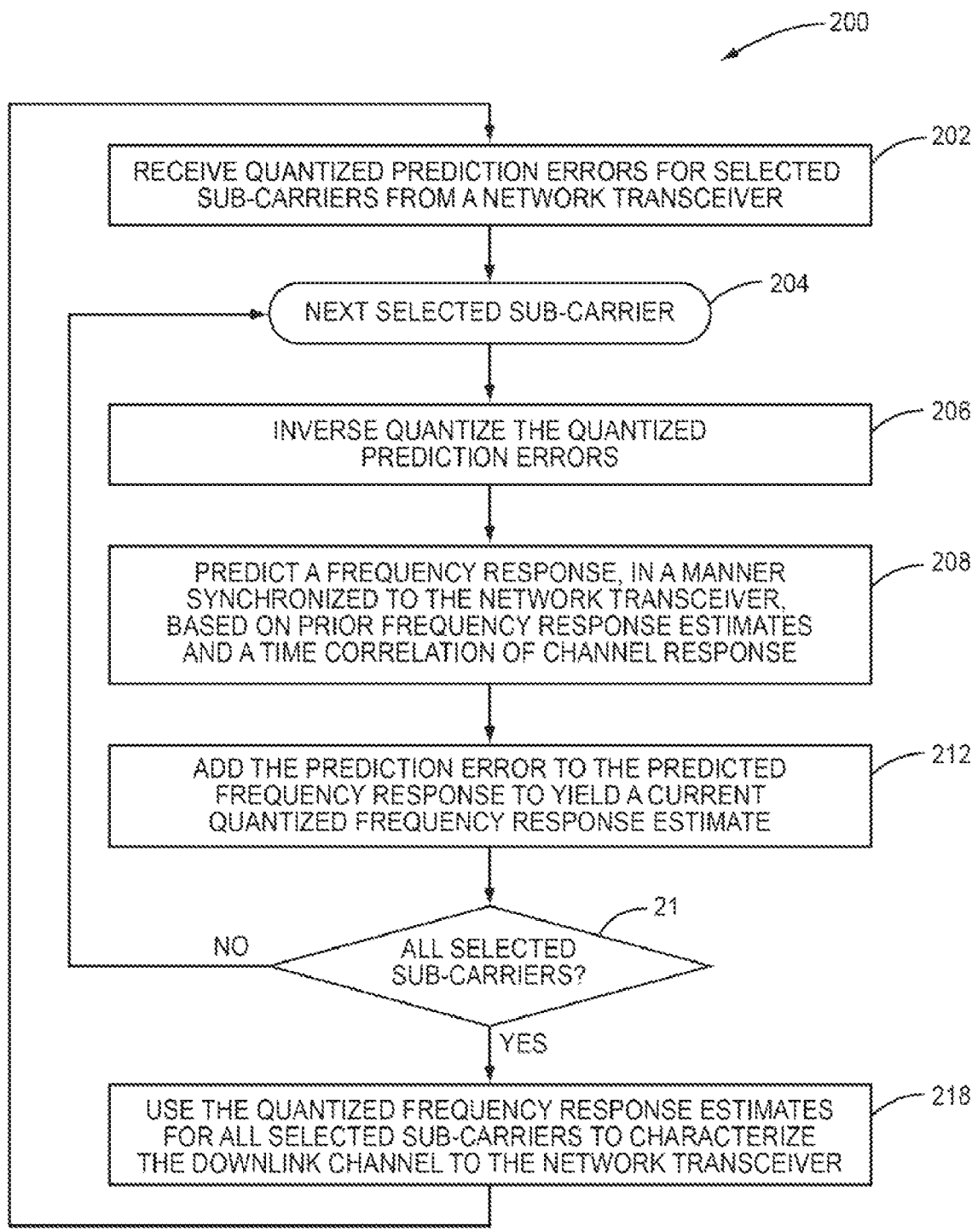
FIG. 5 is a flow diagram of a method of interpreting CSI at a network node.

FIG. 3 is a functional block diagram 60 of a method 200, depicted in FIG. 5 in flow diagram form, of interpreting received CSI by a network node operative in a wireless communication network in which downlink data is modulated onto a plurality of sub-carriers, each having a different frequency. At each iteration, or reporting interval, the network node, such as a Node B 18, receives quantized prediction errors $b_m(t)$ 61 for a plurality of selected sub-carriers from a network transceiver, such as a UE 20 (step 202). The selected sub-carriers are denoted by $(k_1, k_2, \ldots, k_M)$. Each channel (corresponding to each selected sub-carrier) is then characterized by the Node B 18. This process is described for the m-th selected sub-carrier, denoted $k_m$, but is repeated for all sub-carriers (step 204).

The Node B 18 inverse quantizes the received quantized prediction errors $b_m(t)$ 61 (step 206), using an inverse quantizer 62 matched to the quantizer 46 used in the UE 20. That is, the inverse quantizer 62 has the same quantization levels, and separately inverse quantizes the I and Q components of the received quantized prediction errors, to yield prediction errors 64.

The Node B 18 then predicts a frequency response value $r(m;t)$ 66 for $k_m$, based on prior frequency response estimates and a time correlation of channel response (step 208). The frequency response prediction is generated by a linear predictor 68. Each predictor 68 obtains a state vector $s_m(t)$ 70 of size L×1, and a prediction coefficient vector $w_m$ 72 of size 1×L. The state vector $s_m(t)$ 70 is a vector of prior values of quantized frequency response estimates (as described below) of $k_m$. The prediction coefficient vector $w_m$ 72 is a vector of linear predictive coefficients based on a time correlation of channel response for $k_m$. The state vector $s_m(t)$ 70 and prediction coefficient vector $w_m$ 72 are multiplied in the linear predictor 68 to yield the frequency response prediction $r(m;t)$ 66 for $k_m$, which is a scalar complex-valued number.

The Node B 18 next adds the predicted frequency response $r(m;t)$ 66 to the prediction error 64 at summer 74, yielding a current quantized frequency response estimate $H_q(m;t)$ 76 (step 210). This process is repeated for all selected sub-carriers $(k_1, k_2, \ldots, k_M)$ (steps 212, 204), generating the vector:

$$V(t) = [H_q(1;t) H_q(2;t) \ldots H_q(M;t)]. \quad (2)$$

The vector V(t), of quantized frequency response estimates for all selected sub-carriers, is then used to characterize the downlink channel to the UE 20 (step 214), using known signal processing techniques. For example, The Node B 18 may estimate the complete frequency domain channel coefficients by setting a time-domain tap-delay channel model based on the quantized frequency response estimates, and apply a Fast Fourier Transform (FFT) to the estimated delay coefficients to yield a frequency-domain response of the channel. The channel characterization may then be used for known procedures, such as removing channel effects from communication signals received from the UE 20, and/or performing link adaptation for transmissions to the UE 20.

The state vector $s_m(t)$ 70 is updated for each selected sub-carrier. During each reporting interval, the quantized channel estimate $H_q(M;t)$ 76, which depends only on the predicted frequency response $r(m;t)$ 66 and the prediction error 64 received from the UE 20, is added to the state vector $s_m(t)$ 70, and the oldest value is dropped. This processing of the state vector $s_m(t)$ 70, and well as storage, is performed in the state vector update block 78. The state vectors for all selected sub-carriers are updated similarly. The method 200 repeats for each reporting interval.

As noted, the quantized channel estimates $H_q(M;t)$ 54, 76 at the UE 20 and Node B 18, respectively, depend only on each nodes' predicted frequency response, and the prediction error generated by the UE 20 and transmitted to the Node B 18. Each node's frequency response prediction $r(m;t)$ 34, 66, in turn, depend only on the state vectors $s_m(t)$ 38, 70 and prediction coefficient vectors $w_m$ 40, 72. So long as the state vectors $s_m(t)$ 38, 70 are initialized and updated in a coordinated manner at the UE 20 and Node B 18, the Node B 18 can construct an accurate estimate of the channel measured by the UE 20, based only on the received quantized prediction errors $b_m(t)$ 48 transmitted by the UE 20 and $b_m(t)$ 61 received by the Node B 18 (assuming there are no undetected transmission errors).

In general, at both the state vector update blocks 56 and 78, the updating of the state vectors $s_m(t)$ 38, 70 may be implemented by setting $s_m(i;t)$ (the i-th element of the state of the m-th predictor) to an estimate of the channel at the m-th subcarrier and reporting time interval t−i. If the m-th subcarrier remains the same over the maximum memory of the predictor, this value is simply $H_q(m;t-i)$. If the m-th subcarrier changes over the maximum memory of the predictor—that is, the set of sub-carriers selected by the UE 20 for channel estimation changes—the value $s_m(i;t)$ can be obtained by interpolation from the elements of $[H_q(1;t-i), \ldots, [H_q(M;t-i)]$. This may, for example, comprise a linear interpolation, or an interpolation according to one of the methods outlined in application Ser. No. 12/555,966 cited above, for reconstruction of the channel at the network from previously reported CSI bits.

When a new sub-carrier is added to the set of selected sub-carriers used for channel estimation, the states of the predictors for this sub-carrier at the UE 20 and the Node B 18 (or other network 10 node) should be synchronized. The synchronization can be accomplished by applying identical update rules, as disclosed above, at the UE 20 and the Node B 18. This has the advantage of not consuming additional radio resources to exchange information between the UE 20 and the Node B 18. Alternatively, when different updating methods are implemented at the UE 20 and the Node B 18, auxiliary information is exchanged between the two entities to synchronize the predictor states.

In one embodiment, the Node 18 (or other network 10 node) may command the UE 20 to add or remove a sub-carrier from its set of selected sub-carriers for CSI feedback. The Node B 18 may make the decision on the addition or removal of sub-carriers, for example, based on a change in the channel delay profile measured in the reverse link, in order to properly populate the selected sub-carriers, or based on a predefined pseudo-random selection. Methods and arrangements for such synchronized reporting sub-carrier sets are taught in application Ser. No. 12/555,966 cited above.

Once a new sub-carrier is added to the selected set, and following the synchronization of the states of the predictors at the UE 20 and the Node B 18 for the new subcarrier, the UE 20 preferably continues reporting CSI on this sub-carrier at every subsequent reporting instance, until this subcarrier is dropped from the selected set of subcarriers.

In one embodiment, the quantizers 46 for all the selected sub-carriers have the same parameters (i.e., the same number of bits, and the same quantization levels). This follows from the non-trivial observation that equation (1), reproduced below $$\rho_H(k;l) = E\{H(k;n)H^*(k;n-l)\} \quad (1)$$

is the same for all subcarriers "k". This implies that the time correlation of H(k,n) is the same for all subcarriers "k". With this observation, only one set of quantizer parameters needs to be exchanged between the UE 20 and the Node B 18. This also has implications for the predictors, as discussed in greater detail below.

In one embodiment, the quantization levels of the quantizer 46 used by the UE 20 for each selected sub-carrier is the optimal (i.e., minimum distortion) quantizer corresponding to an input to a quantizer with a zero-mean Gaussian probability distribution function and having variance equal to the variance of the real part of prediction error e(m;t) 44 in FIG. 2. In one embodiment, the variance of the real part (or the imaginary part) of the input to the quantizer 46 in FIG. 2 is communicated from the UE 20 to the Node B 18 on slow a basis.

In one embodiment, the quantization levels of the quantizer 46 used at the UE 20 are derived from the variance of the real part (or imaginary part) of e(m;t) 44 according to an algorithm known to both the UE 20 and the Node B 18. For example, one appropriate algorithm is the Lloyd-Max algorithm described in a paper by S. P. Lloyd, titled "Least Squares Quantization in PCM," published as Bell Laboratories Technical Note, 1957, the disclosure of which is incorporated herein by reference in its entirety. In this manner, the Node B 18 is able to form the inverse quantizer 62 associated with the quantizer 46 used by the UE 20 from the knowledge of the variance of the real part (or imaginary part) of e(m;t) 44 alone. This avoids the necessity for the UE 20 to communicate multiple quantization levels to the Node B 18.

In one embodiment, the prediction coefficients comprising the prediction coefficient vectors $w_m$ 40, 72 for all the selected subcarriers are the same. This again follows from the above non-trivial observation that time correlation of H(k;n), see equation (1), is the same for all subcarriers "k". With this observation, only one set of predictor coefficients needs to be exchanged between the UE 20 and the Node B 18. In one embodiment, the predictor coefficients used at the UE 20 are communicated from the UE 20 to the Node B 18 on slow basis.

Embodiments described herein significantly reduce CSI feedback overhead compared with the prior art technique of persistent digital loopback as described in application Ser. No. 12/555,966 cited above, while enabling highly accurate CSI availability to the network. Simulations were conducted to compare and quantify this performance improvement. The environment simulated is the 3GPP SCM Case 3 channel (see 3GPP Technical Specification TR 25.996, incorporated herein by reference in its entirety) with two transmit antennas at the Node B 18 and with one receive antenna at the UE 20. A UE 20 speed of 3 kmph, and carrier frequency of 2 GHz, were selected.

Figure 6:
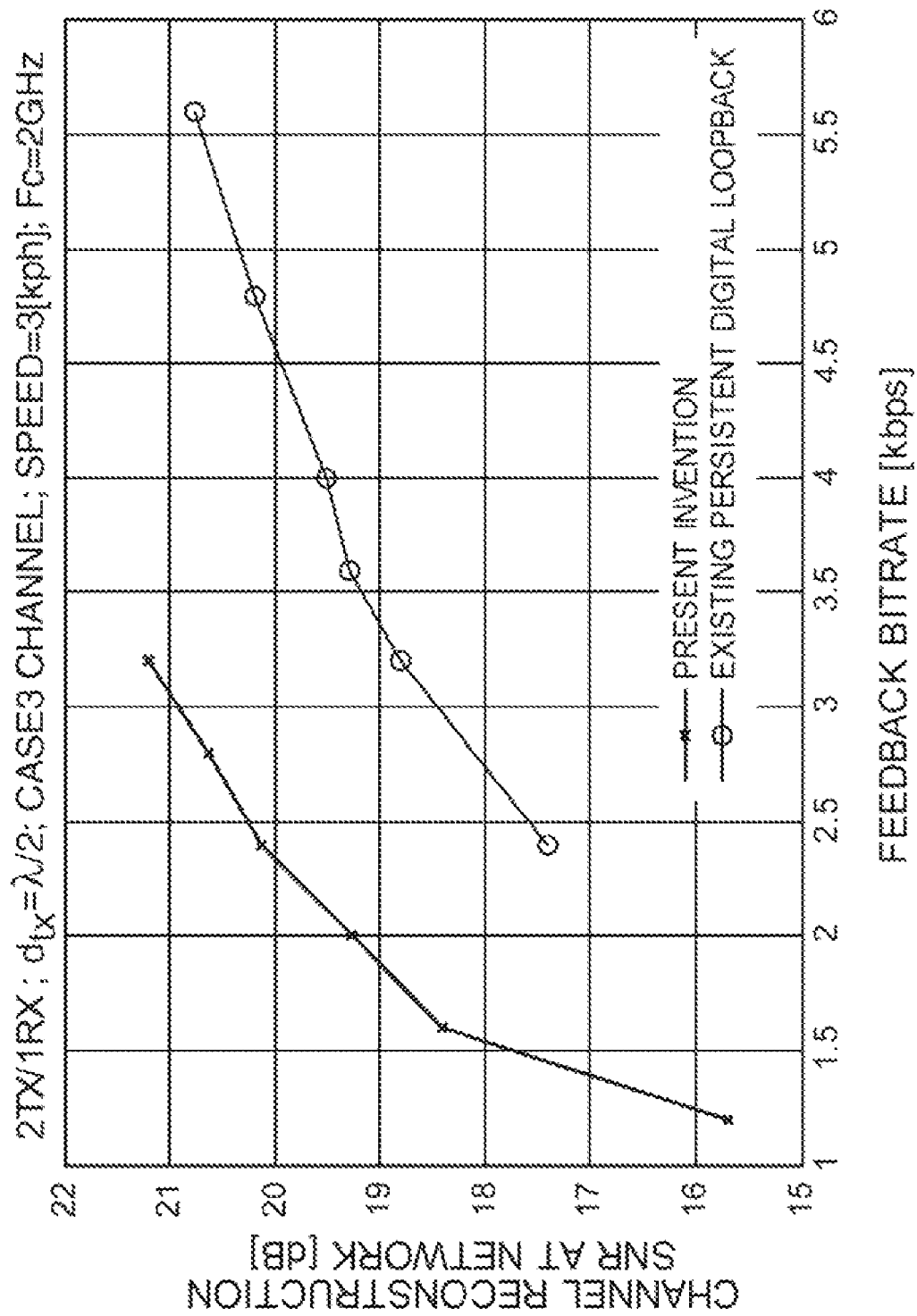
FIG. 6 is a graph comparing the performance as a function of bitrate of inventive CSI reporting to prior art CSI reporting.

FIG. 6 depicts the performance of persistent digital loopback and embodiments of the present invention, in terms of reconstruction SNR at the network versus the bitrate required for CSI feedback. Note that in both cases, as the bitrate devoted to CSI increases, the reconstruction accuracy improves (higher SNR). However, a given level of reconstruction SNR is consistently reached in embodiments of the present invention at a bit rate well below that required for comparable performance using persistent digital loopback. For example, for a reconstruction accuracy of 19 dB, the existing digital loopback scheme requires 3.3 kbps feedback. The same performance using embodiments of the present invention requires only 1.8 kbps of CSI feedback. This example shows that embodiments of the present invention can reduce the CSI bitrate by approximately 45%. The improvement at higher reconstruction SNR is even more dramatic.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An efficient method of reporting channel state information (CSI) by a transceiver operative in a wireless communication network in which downlink data is modulated onto a plurality of sub-carriers, each having a different frequency, comprising, at each iteration:
   receiving a plurality of known reference symbols over a subset of the plurality of sub-carriers;
   selecting a set of sub-carriers using a selection scheme synchronized to the network;
   for each selected sub-carrier,
      estimating a frequency response;
      predicting a frequency response, in a manner synchronized to the network, based on prior frequency response estimates and a time correlation of channel response wherein predicting a frequency response based on prior frequency response estimates further comprises:
         maintaining a state vector comprising prior values of quantized frequency response estimates of the selected sub-carrier;
         generating a coefficient vector comprising linear predictive coefficients based on a time correlation of channel response; and
         multiplying the state vector by the coefficient vector to yield a scalar complex-valued frequency response prediction;
      subtracting the predicted frequency response from the estimated frequency response to yield a prediction error;
      quantizing the prediction error; and
   transmitting the quantized prediction errors for all selected sub-carriers to the network via an uplink control channel.

2. The method of claim 1 wherein the predictive coefficients for all sub-carriers in the set of selected sub-carriers are the same.

3. The method of claim 1 wherein the sub-carrier was in the set of selected sub-carriers during the preceding CSI reporting interval, and further comprising updating the state vector by:
- adding the quantized prediction error to the predicted frequency response to yield a current quantized frequency response estimate;
- appending the current quantized frequency response estimate to the state vector; and
- removing the oldest quantized frequency response estimate from the state vector.

4. The method of claim 1 wherein the sub-carrier is newly added to the set of selected sub-carriers for the current CSI reporting interval, and wherein maintaining a state vector comprising prior values of quantized frequency response estimates of the selected sub-carrier comprises:
- interpolating between values for the current CSI reporting interval of state vectors associated with the nearest flanking sub-carriers that were in the set of selected sub-carriers for the preceding CSI reporting interval;
- creating a new state vector for the sub-band; and
- initializing the new state vector with the interpolated value.

5. The method of claim 4 further comprising removing a state vector associated with a sub-carrier removed from the set of selected sub-carriers for the current CSI reporting interval.

6. An efficient method of reporting channel state information (CSI) by a transceiver operative in a wireless communication network in which downlink data is modulated onto a plurality of sub-carriers, each having a different frequency, comprising, at each iteration:
- receiving a plurality of known reference symbols over a subset of the plurality of sub-carriers;
- selecting a set of sub-carriers using a selection scheme synchronized to the network;
- for each selected sub-carrier,
  - estimating a frequency response;
  - predicting a frequency response, in a manner synchronized to the network, based on prior frequency response estimates and a time correlation of channel response;
  - subtracting the predicted frequency response from the estimated frequency response to yield a prediction error;
  - quantizing the prediction error, wherein quantizing the prediction error comprises separately quantizing real and imaginary parts of the prediction error using a quantizer having predetermined quantization levels; and
- transmitting the quantized prediction errors for all selected sub-carriers to the network via an uplink control channel.

7. The method of claim 6 wherein the quantizer and quantization levels are synchronized to the network.

8. The method of claim 7 wherein the quantization levels of the quantizer is the minimum distortion quantizer corresponding to an input to a quantizer with a zero-mean Gaussian probability distribution function and having variance equal to the variance of one of the real or imaginary part of the prediction error.

9. The method of claim 7 wherein the quantization levels of the quantizer are derived from the variance of one of the real or imaginary part of the prediction error according to an algorithm used at both the UE and the network.

10. The method of claim 9 wherein the algorithm is a Lloyd-Max algorithm.

11. A transceiver operative in a wireless communication network in which downlink data is modulated onto a plurality of sub-carriers, each having a different frequency, comprising:
- one or more antennas;
- a transceiver operatively connected to the antenna(s) and operative to receive a plurality of known reference symbols over a subset of the plurality of sub-carriers;
- a controller operative to select a set of sub-carriers using a selection scheme synchronized to the network;
- for one or more selected sub-carriers,
  - a frequency response estimator operative to estimating a frequency response;
  - a linear predictor operative to predict a frequency response, in a manner synchronized to the network, based on prior frequency response estimates and a time correlation of channel response;
  - a summer operative to subtract the predicted frequency response from the estimated frequency response to yield a prediction error; and
  - a quantizer operative to quantize the prediction error;
- wherein the transceiver is further operative to transmit channel state information (CSI) in the form of quantized prediction errors for all selected sub-carriers to the network via an uplink control channel; and
- an inverse quantizer, matched to the quantizer, operative to inverse quantize the quantized prediction error; and
- a summer operative to add the inverse quantized prediction error to the predicted frequency response to yield a quantized frequency response estimate.

12. The transceiver of claim 11 further comprising a state vector update block operative to store and maintain a state vector comprising prior values of quantized frequency response estimates for each selected sub-carrier.

* * * * *

UNITED STATES PATENT AND TRADEMARK OFFICE
CERTIFICATE OF CORRECTION

Page 1 of 1

PATENT NO. : 8,406,326 B2
APPLICATION NO. : 12/779106
DATED : March 26, 2013
INVENTOR(S) : Cheng et al.

It is certified that error appears in the above-identified patent and that said Letters Patent is hereby corrected as shown below:

On the Title Page, in item (75), under "Inventors" in Column 1, Line 3,
delete "Chapel Hill, CA" and insert -- Chapel Hill, NC --, therefor.

In the Specifications:

In Column 2, Line 11, delete "tilted" and insert -- titled --, therefor.

In Column 4, Line 12, after Equation (1), insert -- . --.

In Column 4, Line 64, delete "106)" and insert -- 106). --, therefor.

In Column 6, Line 66, delete "Node 18" and insert -- Node B 18 --, therefor.

Signed and Sealed this
Sixteenth Day of July, 2013

Teresa Stanek Rea
*Acting Director of the United States Patent and Trademark Office*